May 3, 1932.  J. J. KLESCHKA  1,857,000

HYDRAULIC TRANSMISSION MECHANISM

Filed Oct. 5, 1927    6 Sheets-Sheet 1

J. J. Kleschka
INVENTOR

BY Victor J. Evans
ATTORNEY

May 3, 1932. J. J. KLESCHKA 1,857,000
HYDRAULIC TRANSMISSION MECHANISM
Filed Oct. 5, 1927 6 Sheets-Sheet 2

J.J.Kleschka
INVENTOR
BY Victor J. Evans
ATTORNEY

May 3, 1932.   J. J. KLESCHKA   1,857,000
HYDRAULIC TRANSMISSION MECHANISM
Filed Oct. 5, 1927   6 Sheets-Sheet 4
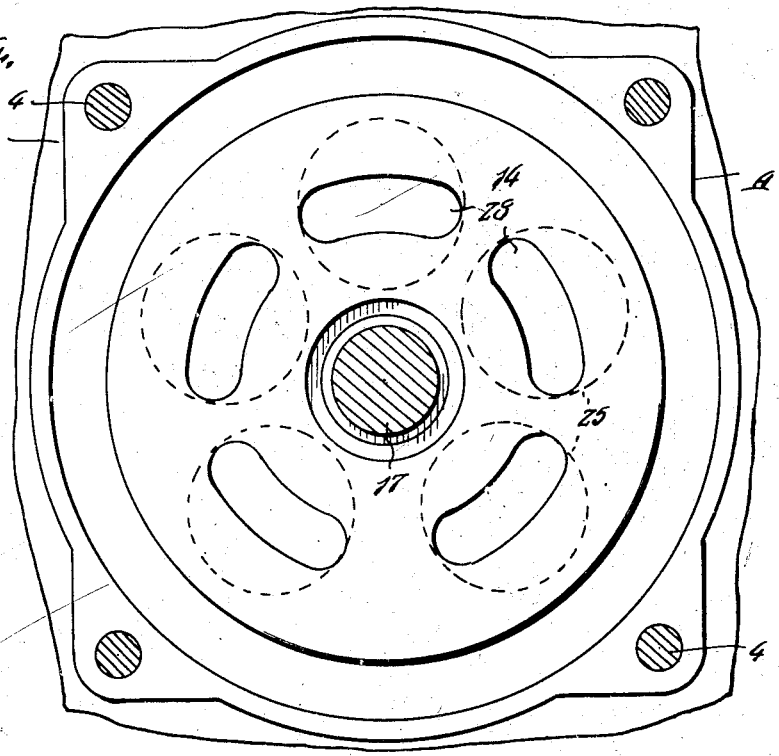
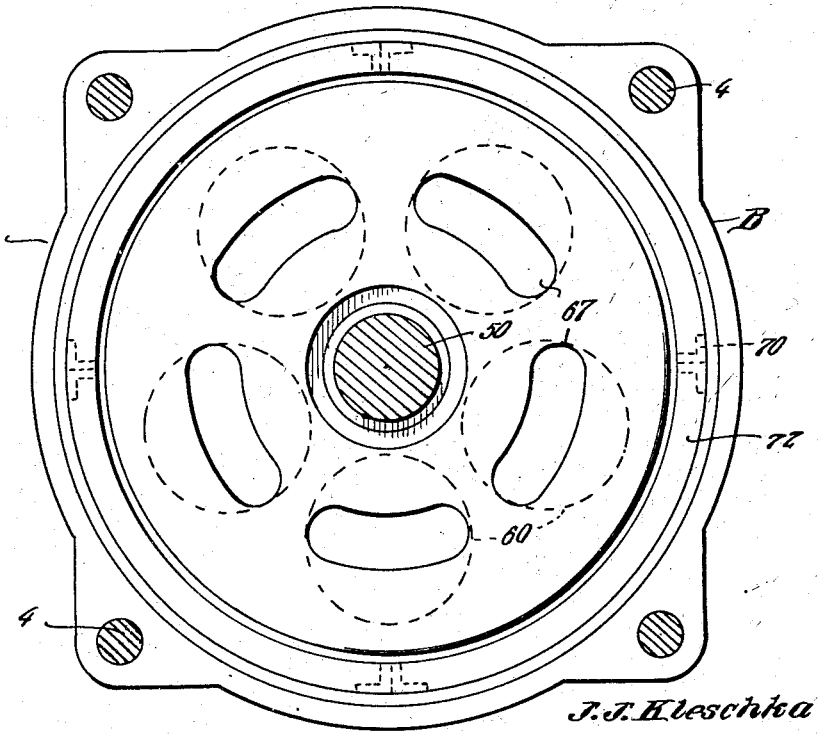
J. J. Kleschka
INVENTOR
BY Victor J. Evans
ATTORNEY May 3, 1932. J. J. KLESCHKA 1,857,000
HYDRAULIC TRANSMISSION MECHANISM
Filed Oct. 5, 1927 6 Sheets-Sheet 5

J. J. Kleschka
INVENTOR
BY Victor J. Evans
ATTORNEY

May 3, 1932.　　　J. J. KLESCHKA　　　1,857,000

HYDRAULIC TRANSMISSION MECHANISM

Filed Oct. 5, 1927　　　6 Sheets-Sheet 6

J. J. Kleschka
INVENTOR

BY Victor J. Evans
ATTORNEY

Patented May 3, 1932

1,857,000

UNITED STATES PATENT OFFICE

JOHN JOSEPH KLESCHKA, OF WATERBURY, CONNECTICUT

HYDRAULIC TRANSMISSION MECHANISM

Application filed October 5, 1927. Serial No. 224,200.

This invention relates to transmission devices, particularly those of the hydraulic type, and has for its object the provision of a novel mechanism whereby rotary motion of a drive shaft may be imparted at variable speeds and in either direction to a driven shaft in a smooth and gradual manner and without there being any definite steps or abrupt gradations.

An important object is to provide a transmission mechanism in which the drive shaft will rotate continuously at a uniform speed, the power being derived from an engine of any kind, an electric motor or in fact any other power means.

Another object is to provide a mechanism of this character in which the coupling medium consists of an incompressible liquid such as oil which is so handled and treated in the apparatus as to prevent any appreciable leakage and to maintain a constant circulation, means being also provided for automatically reducing the pressure in case it becomes excessive in order to avoid bursting or breaking of any of the parts under strain.

Another object is to provide a mechanism of this character provided with control means whereby the speed of the driven element with respect to the drive element may be varied or made in any desired proportion depending upon circumstances or the particular character of work to be done.

An additional object is to provide an apparatus of this character which will be comparatively simple and inexpensive to manufacture, easy to assemble and control, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings, in which:

Figure 4 is a vertical cross sectional view taken on the line 4—4 of Figure 2 looking in the direction of the arrows.

Figure 6 is a vertical cross section taken on the line 6—6 of Figure 2 looking toward one end.

Figure 1:
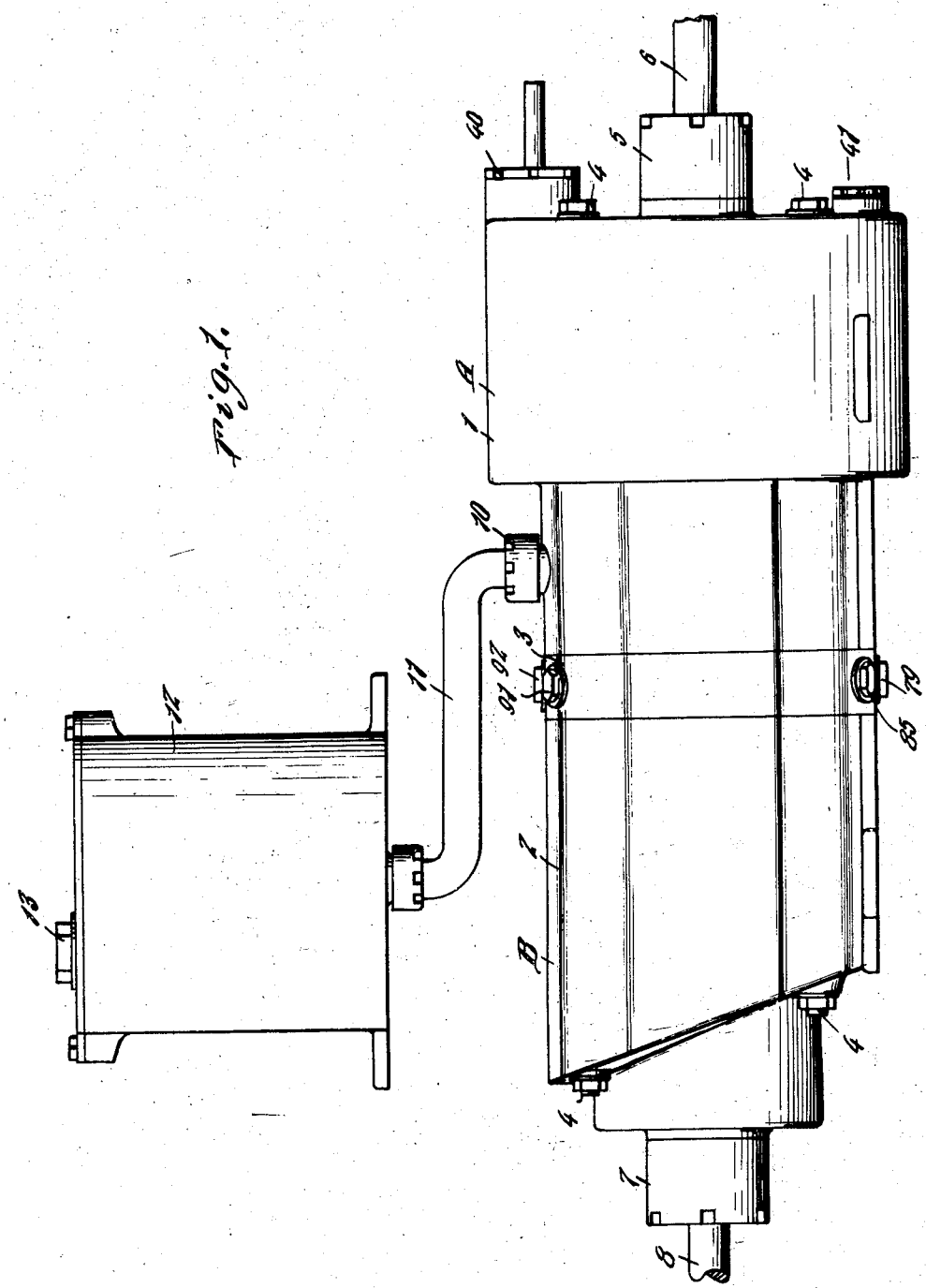
Figure 1 is a side elevation of the complete apparatus.
Figure 2:
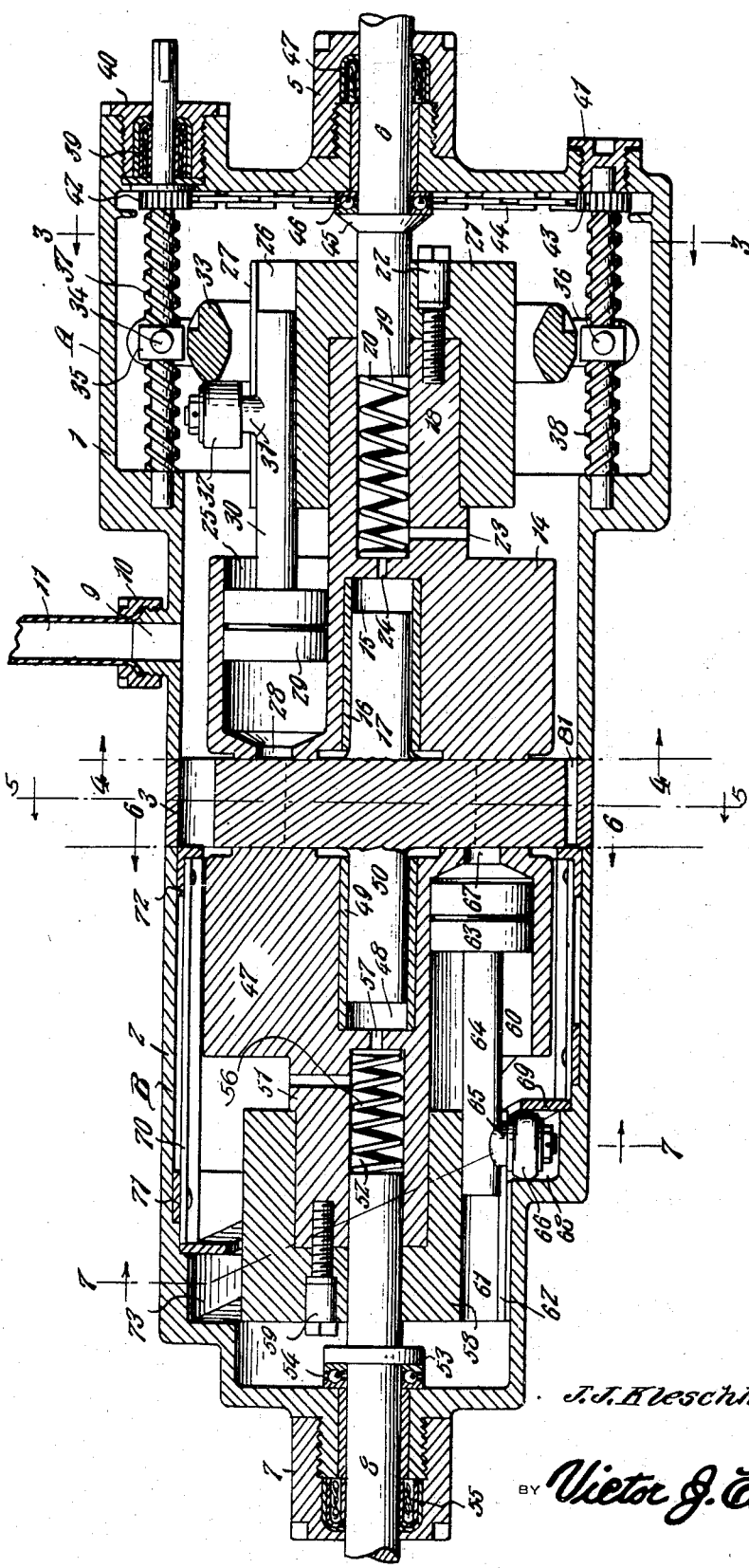
Figure 2 is a vertical longitudinal sectional view.
Figure 3:
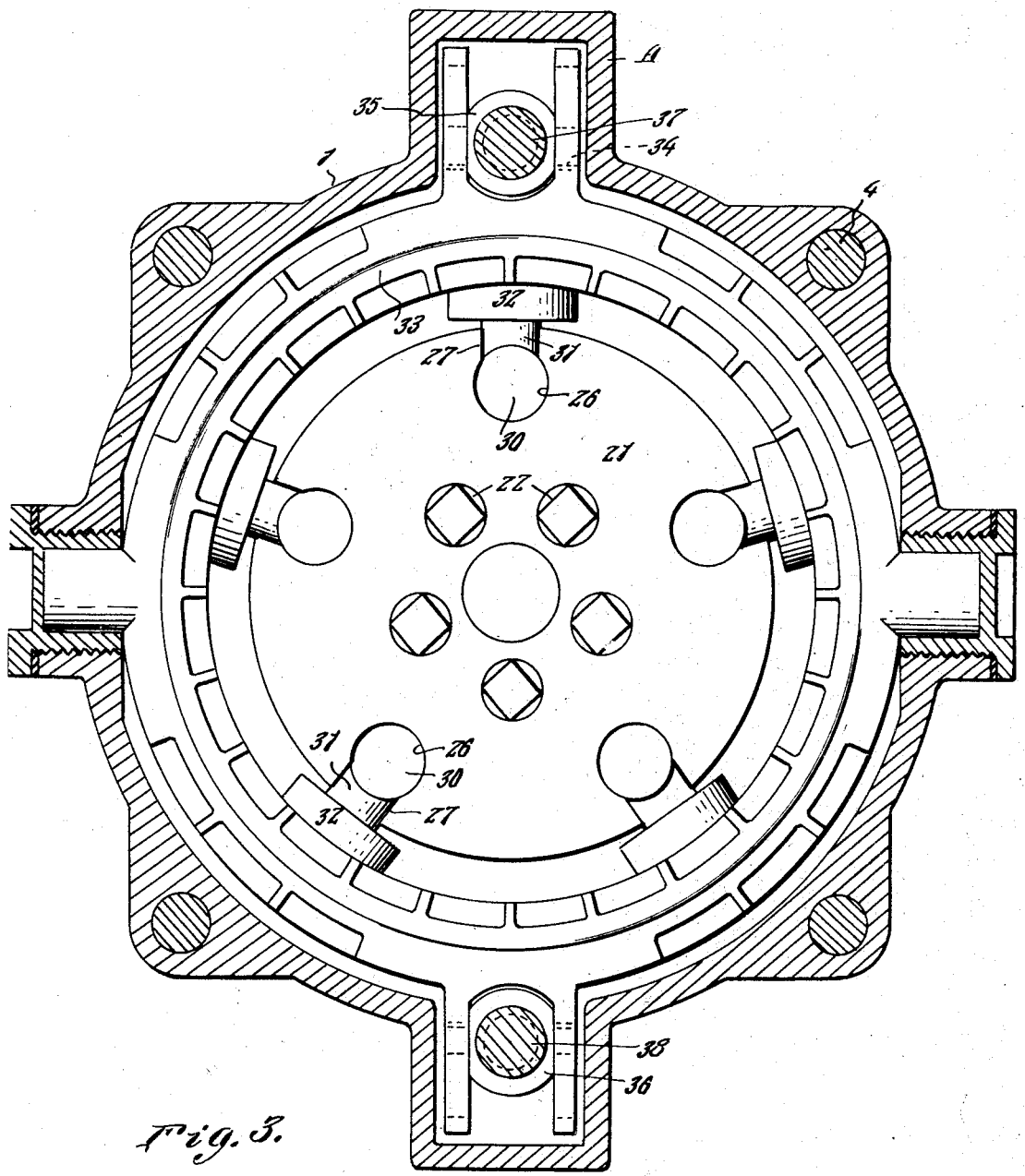
Figure 3 is a vertical cross sectional view taken on the line 3—3 of Figure 2 looking in the direction of the arrows.
Figure 5:
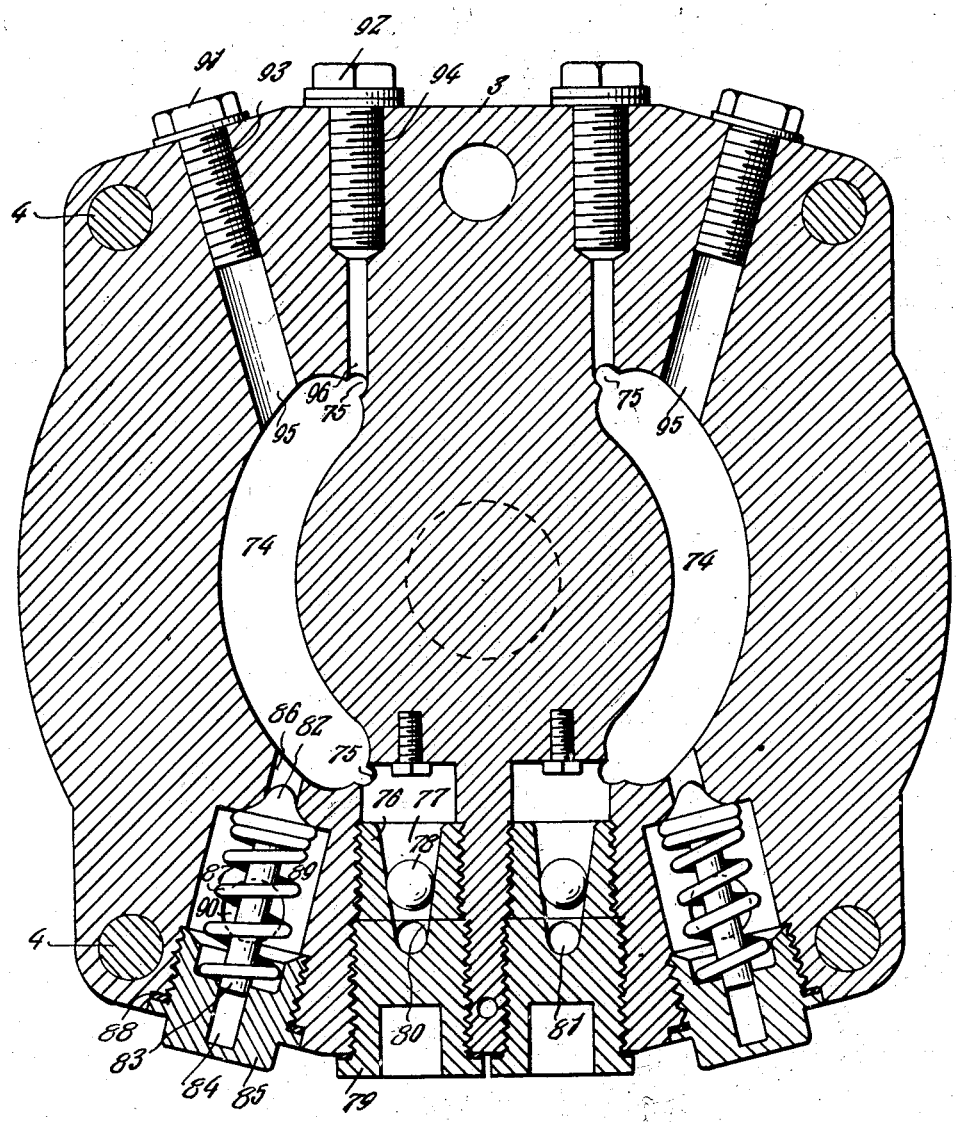
Figure 5 is a sectional view taken on the line 5—5 of Figure 2.
Figure 7:
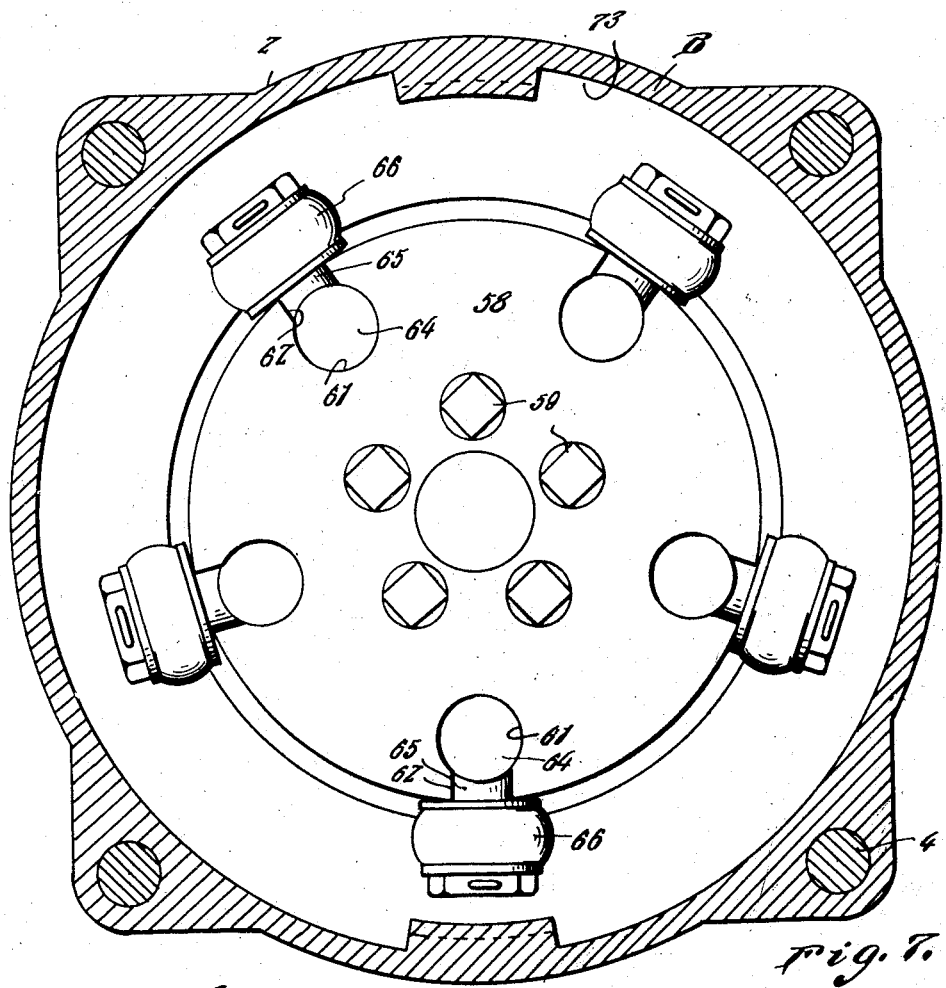
Figure 7 is a detail sectional view taken on the line 7—7 of Figure 2.
Figure 8:
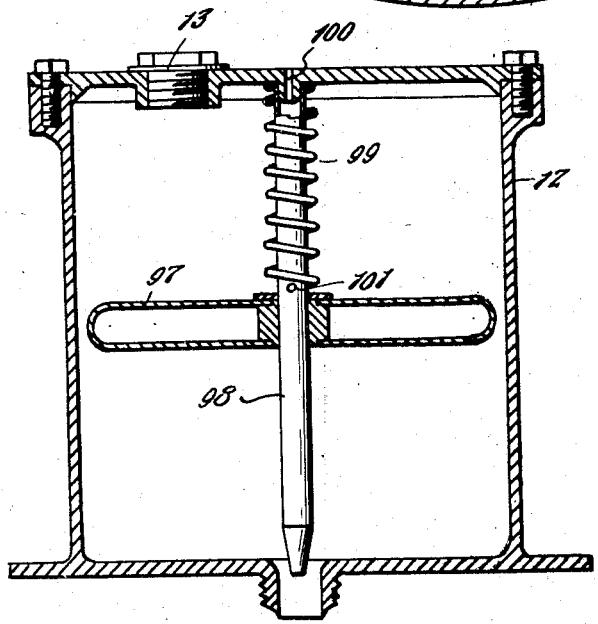
Figure 8 is a detail section through the distributor tank or expansion tank.

Referring more particularly to the drawings, the machine is shown as consisting essentially of two separate mechanisms designated generally by the letters A and B, the letter A referring to one end and the letter B to the other end. The mechanism within the A end is an oil pump operated by the driving power, regardless of what that may be and acting to deliver oil to the mechanism in the B end at any required pressure, the oil being reconveyed to the A end so as to maintain a constant circulation. The A end contains a controlling device, to be described, by which the quantity of oil delivered to the B end is regulated exactly to meet the speed requirements thereof. The drive shaft in the A end is supposed to rotate continuously in one direction or the other. The mechanism within the B end constitutes a hydraulic engine having its rotating parts preferably almost identically the same as those at the A end. In its capacity as an engine its shaft rotates at any speed desired and in either direction in exact obedience to the quantity and direction of delivery of the oil it receives from the A end of the machine. When conditions permit, the two ends may be united into one machine, as illustrated in the drawings, a middle partition or valve plate separating the two parts in the manner to be explained.

More specifically, the mechanism within the A end is enclosed within a casing 1 while the mechanism within the B end is enclosed within a casing 2, both casings being preferably cylindrical in general form and being located at opposite sides of and suitably secured to a partition member or valve plate 3. The means for securing the two casings or shells to the partition member or valve plate preferably comprises a plurality of longitudinally extending bolts 4 equipped, naturally, with suitable nuts though it is readily conceivable that any other preferred form of connecting means may be employed if found advisable for any reason. It is also readily apparent that the casing members may be formed in single pieces as castings or constructed of any desired number of parts bolted or otherwise suitably secured together, depending upon circumstances and the desires of the manufacturer. The casing member or shell 1 at the A end of the machine is represented as being provided centrally with a stuffing box 5 through which extends the drive shaft 6 which is rotated by any suitable mechanism whatsoever, such, for example, as an internal combustion engine, a steam engine, an electric motor or other mechanical device.

The shell or casing 2 of the B end of the device is disclosed as provided axially with a stuffing box 7 through which is journaled the driven shaft 8 of whatever mechanism or device is intended to be operated by the invention. At this point, it may be well to reiterate that it is immaterial what drives the shaft 6 or what is driven by the shaft 8, as this would naturally all depend upon the nature of the mechanism in connection with which the invention is employed.

It is intended that the entire space within the shell or casing members 1 and 2 be filled with oil, or any other suitable liquid, and for this reason I have shown the casing member or shell 1 as provided at one side with a suitable nipple 9 with which is connected, as by a union 10, a pipe 11 leading from an expansion tank 12 adapted to be filled with oil and therefore provided with a filling opening normally closed by a plug or the like 13. Whether or not any pipe 11 is provided or whether the expansion tank 12 be constructed as part of the shell or casing members 1 and 2, would naturally depend upon circumstances such as the space within which the entire mechanism is intended to be mounted.

At this point it may be well to state that in case it is not convenient to have the A and B ends arranged close together and secured to a common valve plate such as that indicated at 3, they may of course be separated, each then having its own valve plate, the various ports in which, to be described, would be connected by suitable pipes. However, for the sake of clearness, it is believed probably preferable to confine the description to what is readily illustrated in the drawings, hence for the purposes of explanation, it will be assumed that the shell members 1 and 2 are mounted at opposite sides of a single valve plate 3. It may also be well to state that the casing members or shells 1 and 2 may be provided with any suitable legs of foot portions whereby the machine may be bolted or otherwise secured upon a suitable support. Mounted within the casing or the shell 1 is a rotor 14 having an axial recess 15 therein within which is located a suitable bearing bushing 16 rotatably engaged upon a trunnion 17 projecting from one side of the valve plate 3. This rotor further includes a reduced extension or hub portion 18 having an axial recess 19 therein into which extends the shaft 6 and within which is located a coil spring 20 which abuts against the end of the shaft and which acts to force the rotor into close engagement with the face of the valve plate. Secured to the reduced extension 18 is a member 21 held thereto as for instance by means of the bolt 22, or any desired number of such bolts. The shaft 6 is of course splined with respect to the rotor and member 21 so as to be slidable but non-rotatable with respect thereto. It should also be mentioned that the extension 18 is formed with any desired number of lateral passages 23 communicating with the recess or bore 19 and the interior of the case, and also formed with an axial opening 24 establishing communication between the recess or bore 19 and the recess 15, these passages being for lubricating purposes. The rotor 14 is provided with any desired number of cylinders 25, five being shown in the present instance, and the member 21 is formed with a corresponding number of longitudinally extending guide bores 26 opening into slots 27. The cylinder ends adjacent the valve plates 3 are formed with ports 28 for a purpose to be described.

Slidably mounted within each of the cylinders 25 is a piston 29 carried by a piston rod 30 slidable within the guide bore 26 and carrying a laterally extending arm 31 projecting through the slot 27 and carrying a roller 32 suitably journaled thereon and prevented from displacement by any suitable means whatsoever.

The rollers 32 cooperate with a shiftable cam ring 33 which is pivotally connected at diametrically opposite points, and as shown at 34, with nut members 35 and 36 engaged upon screws 37 and 38, respectively, journaled longitudinally of the casing or shell 1, the outer end of the screw member 37 being preferably journaled within a roller bearing 39 located within a plug like member 40, and the screw member 38 having its outer end suitably journaled within a plug member 41. The outer end of the screw member 37 projects beyond the plug member 40 and is squared or otherwise formed for engagement of suitable turning means thereon whereby the screw may be rotated. The screw members 37 and 38 carry sprockets 42 and 43, respectively, peripherally engaged by a suitable chain 44 so that when a turning tool is applied to the projecting end of the screw member 37, and the screw rotated, the screw 38 will be correspondingly rotated. It should be noted that the screw members 37 and 38 are oppositely threaded so that when they are rotated, simply by turning the screw member 37, the cam ring 33 will be shifted into an angular position for effecting operation of the various pistons 29 in a manner to be more fully explained hereinafter.

While it may be considered a particularly important matter, it may be well to state, in passing, that the shaft 6 carries a thrust collar 45 cooperating with a ball bearing structure 46, and that the stuffing box 5 contains a roller bearing structure 47 for making the shaft 6 easy running.

Within the B end of the machine or device, is mounted a rotor 47 having a recess 48 therein containing a bushing 49 rotatably engaged upon a trunnion 50 projecting from the adjacent face of the valve plate 3. This rotor 47 has a reduced extension 51 thereon formed with a bore or recess 52 within which is splined the driven shaft 8, this shaft being preferably equipped with a thrust collar 53 cooperating with a ball bearing structure 54. The stuffing box 7 may also be provided interiorly with a roller bearing structure 55 to make the driven shaft easy running. Within the recess or bore 52 it is preferable to provide a coil spring 56 which abuts against the inner end of the driven shaft and against the rotor 47 for the purpose of forcing the rotor toward the valve plate. Any desired number of oil passages 57 may be provided for establishing communication between the bore or recess 52 and the bore or recess 48, all for establishing communication between the latter and the interior of the shell or casing 2 for lubricating purposes. The reduced extension 51 carries a member 58 held in place as by the bolt device 59. The rotor 47 is provided with any suitable number of cylinders 60 and the member 58 is formed with a corresponding number of guide bores or openings 61 communicating with slots 62 in the outer periphery of the member 58. Within the cylinders 60 are pistons 63 carried by piston rods 64 having laterally extending arms 65 thereon extending through the slots 62 and carrying rollers 66 suitably journally mounted and held against displacement by any suitable means whatsoever. At the inner ends of the cylinders 60 are ports 67 adapted to register with other ports in the valve plates to be described.

The casing or shell 2 is of somewhat peculiar shape at its outer end inasmuch as it is outwardly offset along a diagonal line or along a plane oblique with respect to the longitudinal axis, the purpose being to provide an outer wall 68 spaced from which is a stationarily mounted ring member 69 carried by supporting elements 70 which extend longitudinally within and which are suitably secured to or retained within the casing 2 as by means of rings 71 and 72 secured to the longitudinal members 70 and fitting snugly within the shell or casing. The space 73 between the wall 68 and the ring 69 constitutes a stationary trackway or cam along which the rollers 66 are adapted to operate when the machine is in action.

The above described ports 28 and 67 in the faces of the rotors 14 and 47 which engage against the opposite sides of the valve plate 3 are arcuate or circumferentially elongated in shape as clearly disclosed in Figures 4 and 6, and these ports are adapted to register, at times, with substantially semi-annular ports 74 formed in the valve plate 3. These ports 74 extend entirely through from one face to the other of the valve plate and the oil circulates through them when transmitting power. Between these ports 74 at the top and the bottom are flat faces which may be called "lands" into which are cut or otherwise formed short reduced port extensions 75. As the rotors rotate, the ports 28 and 67 therein pass in succession across these lands between the ports 74 and the contents of the cylinder while being carried across is momentarily imprisoned.

There is naturally a small amount of leakage of oil between the casings or shells 1 and 2 in the operation of the machine and it is therefore necessary to make provision to replace this leakage as fast as it occurs, otherwise there might be a tendency to form a vacuum in the cylinders and ports or passages. For this reason, I provide two check valves in the lower part of the valve plate and in communication with the ports 74. These check valves may be called replenishing valves and each is shown as comprising a seat 76 screwed into place and having an opening 77 therein within which is engaged a ball 78. These seats 76 are held in place by caps or plugs 79 screwed into place and formed with openings 80 registering with passages 81.

In the transmitting of power at very low speeds, in the B end of the mechanism, it is conceivable that the oil pressure may arise to thousands of pounds per square inch should the resistance to be overcome be correspondingly great. It is therefore necessary to provide safety valves to be set for release at any desired maximum pressure, say five hundred or eight hundred pounds. Should the pressure exceed this amount, the oil will escape from the high pressure port passage through one of the relief valves into the case space and flow again through a replenishing valve into the low pressure port passage. There are two of such relief valves shown and each is represented as comprising a valve 82 carried by a stem 83 movable longitudinally within a socket 84 in a plug member 85 screwed into the bottom of the valve plate. The valve 82 seats against and normally closes the end of a passage or port 86 communicating with the adjacent port 74. Any desired means may be provided for adjusting the tension of the spring 87 which urges the valve to its closed position, the means in the present instance being represented as a suitable gasket 88 which may be replaced by a thinner one or an additional number, or by a thicker one, as the case may be. The port or passage 86 communicates with a chamber 89 which in turn communicates through ports 90 with the interior of the casings 1 and 2.

At the highest point in the ports or passages 74 are the air valves which are for the purpose of permitting the escape of any air that may be imprisoned in the various passages of the system. These air valves are represented simply as consisting of threaded plugs 91 and 92 screwed into threaded sockets 93 and 94 respectively with which communicate ports or passages 95 and 96, the former leading into one of the ports 74 and the latter leading into one of the reduced extensions 75 of the ports.

As the proper functioning of the machine requires that the medium of power transmission be practically incompressible, it is important that no air be allowed to mix with the oil. It therefore becomes important that the case be entirely full of oil and it is for this reason that the expansion tank 12 has been provided, it being of course apparent that this tank may be located either directly at the machine or at some convenient point more or less distant, depending upon circumstances. It is however preferable, that this tank be located above the casing of the machine so that any air in the casing will have a chance to bubble up through the connecting pipe 11 and escape through the tank. I also prefer to provide baffle means within this tank, this baffle preferably consisting of a float 97 slidably mounted upon a stem or guide 98 and urged downwardly by a coil spring 99. It is intended that the casing 12 be provided with air relief holes 100 and 101, the former extending axially of the stem or guide 98 above the float and the latter extending laterally into the former at a point above the float. The purpose of the baffle is to prevent splashing of the oil should there be a sudden rush thereof from the case into the tank. This is an important and interesting phenomenon. Should the machine or pressure become overloaded the flow of oil through the relief valve is more rapid than the supply through the replenishing valve for the reason that the relief valve is acting under high pressure while the replenishing valve is acting only under atmospheric pressure. A momentary vacuum is produced in the active body of oil which is the same in effect as if the whole volume of oil had suddenly increased.

In the operation of the mechanism, let it be assumed that the entire space within the casings 1 and 2 is filled with oil, and by saying if the entire space is filled, it is meant that all spaces not actually occupied by metal must be filled with oil. There are no air pockets and in order that no air may enter the casings the oil is made to fill the expansion tank 12 about half full. A definite portion of the oil is enclosed within the various cylinders 25 and 60 ahead of the pistons therein, and also within the ports and passages of the valve plate. This latter mentioned is the really active portion of the oil, and if there were no leakage, the oil within the other spaces would be simply for lubricating purposes inasmuch as it is not under pressure and acts simply as a supply into which leakage from the active oil may flow and from which the leakage is replenished through the replenishing valve 78. Theoretically, the total quantity of oil remains constant. Taking up, first, the A end of the machine, let it be first assumed that the cam ring 33 is in a vertical or neutral position, that is to say perpendicular to the shaft. Under these conditions, the shaft 6, in rotating will carry around with it the rotor 14 and consequently all of the pistons 29, piston rods 30 and rollers 32, but the pistons will have no tendency to reciprocate or move to and fro in the cylinders. There will consequently be no drawing of oil or forcing it out through the valve plate, the only work done being the stirring of the oil in the casing 1 by the rotation of the revolving parts. Consequently, there is no effect whatsoever upon the B end of the mechanism. If the control screw 37 is turned so as to move the top of the cam ring 33 away from the valve plate 3, and if the shaft 6 be rotating in a counter-clockwise direction, all of the pistons, as they move up on the far side of the machine, will draw in oil through the port 74 in the far side of the valve plate 3, and all the pistons as they move down on the near side will slide in toward the valve plate 3 and force the oil through the port 74 in the near side of the valve plate. The near port will thus be under pressure while the far port is in suction. It should be noted that when a piston reaches the top or highest position in its revolution it has no endwise movement for an instant and the oil in that particular cylinder is carried across the land or space between the ports 74 from the suction side to the pressure side. The same condition exists when a cylinder is passing its lowermost position except that the piston is then at the inner end of its stoke and is passing from the pressure side to the suction side. The function of the B end of the mechanism is to receive the oil forced through the valve plate port 74 by the pistons 29 during rotation of the rotor 14. In view of the fact that the trackway 73 at the B end is always at a fixed angle, it will be seen that when the driven shaft 8 rotates, the pistons 63 in the cylinders 60 of the rotor 47 will make a full stroke. The oil forced through the port 74 by the pistons 29 during their movement is received through the port 67 into the cylinders 60 and causes pressure to be applied to the pistons 63 therein. This pressure applied to the pistons reacts through the rollers 66 against the trackway 73 or against the wall 68 thereof, and the result is that the rotor 47 is forced to rotate, carrying with it the driven shaft 8, this whole assembly rotating in the opposite direction to the rotation of the rotor 14. The speed of rotation of the rotor 47 and driven shaft 8 depends upon the quantity of oil supplied to the cylinders 60 by the pistons 29.

Remembering that the cam trackway 73 is always at a fixed angle and the maximum angle, let it be assumed that each cylinder has a capacity of, say, four cubic inches. The revolving of all five of the cylinders 60 at the B end of the mechanism would transfer twenty cubic inches of oil per revolution. If now the worm or screw 37 be turned so as to tilt the cam ring 33 only slightly, say enough to reciprocate each piston 29 to a sufficient extent to change the volume in each cylinder twenty-five one-hundredths of a cubic inch, all five of the cylinders at the A end of the mechanism will together transfer one and twenty-five one-hundredths cubic inches of oil through the valve plate per revolution. If the capacity of the cylinders 60 at the B end of the mechanism is, say, fifteen cubic inches, three hundred rotations of the rotor 14 will be necessary to rotate the rotor 47 once. If the cam ring 33 be tilted still farther, the rotor 14 must make less rotations to effect a single rotation of the rotor 47. The speed of the driven shaft is thus entirely dependent upon the angle through which the control screw 37 has been turned for shifting the position of the cam ring 33. If the cam ring 33 be tilted in the opposite direction, with the drive shaft 6 still rotating in the same direction as before, the direction of flow or passage of the oil through the port 74 will be reversed and this will of course result in causing the rotor 47 and driven shaft 8 to rotate in a direction opposite to that in which it was previously rotating.

The pressure of the oil in the valve plate passages 74 depends upon the resistance offered to the rotation of the driven shaft and not upon the speed. The pressure rises almost instantly to meet any resistance up to the capacity of the driving motor. If the cam ring 33 stands almost perpendicular to the axis of the mechanism, only a very small quantity of oil is transferred at each rotation and this will of course have the effect of giving a very great leverage so that even a small motor may produce a pressure of several hundred pounds and, of course, a corresponding torque or turning effect on the driven shaft. The actual permissible pressure in any particular machine depends upon the strength of the parts but is limited naturally by the setting of the relief valves 82.

From the foregoing description and a study of the drawings, it will be readily apparent that I have thus provided a simply constructed and comparatively inexpensive hydraulic transmission mechanism which is capable of transmitting power at any desired speed and with absolute smoothness, there being no steps or graduations as is the case in the ordinary type of transmission. It is really believed that the construction, operation and advantages will be readily apparent to one skilled in the art without further explanation.

While I have shown and described the preferred embodiment of the invention, it should be understood that I reserve the right to make such change in the details of constuction as well as in the arrangement and combination of parts as will not depart from the spirit of the invention, or the scope of the subjoined claim.

What I claim is:

A device of the character set forth including a casing having rotatable cylinders and rotatable piston guides slidably supporting piston stems of pistons slidably mounted in the cylinders and means for rotating the cylinders and piston guides, rollers carried by the stems, a ring engaging the rollers, oppositely disposed worm shafts journalled in the casing and having the threads of one shaft reversely arranged from the threads of the other shaft, nuts engaging the threads of the shafts and pivotally connected to the ring at opposite sides thereof, and an endless sprocket chain connecting the shafts for rotation one by the other, one of the shafts extending outwardly of the casing and shaped to be engaged by an operating device for rotating the shafts to vary the angles of the ring.

In testimony whereof I affix my signature.

JOHN JOSEPH KLESCHKA.